United States Patent
Choi et al.

(10) Patent No.: US 8,837,334 B2
(45) Date of Patent: Sep. 16, 2014

(54) METHOD FOR RECEIVING CONTROL INFORMATION AND CONTROL INFORMATION SIGNALING AND MOBILE STATION APPARATUS USING THE SAME

(75) Inventors: Jin Soo Choi, Gyeonggi-do (KR); Jin Sam Kwak, Gyeonggi-do (KR); Han Gyu Cho, Gyeonggi-do (KR); Sung Ho Moon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 13/201,968

(22) PCT Filed: Feb. 18, 2010

(86) PCT No.: PCT/KR2010/000999
§ 371 (c)(1),
(2), (4) Date: Aug. 17, 2011

(87) PCT Pub. No.: WO2010/095864
PCT Pub. Date: Aug. 26, 2010

(65) Prior Publication Data
US 2011/0299440 A1    Dec. 8, 2011

Related U.S. Application Data

(60) Provisional application No. 61/153,624, filed on Feb. 18, 2009.

(30) Foreign Application Priority Data

Jan. 25, 2010    (KR) .......................... 10-2010-006394

(51) Int. Cl.
H04J 1/00      (2006.01)
H04W 28/06    (2009.01)
H04W 99/00    (2009.01)

(52) U.S. Cl.
CPC .............. *H04W 28/06* (2013.01); *H04W 99/00* (2013.01)
USPC ....................................................... 370/281

(58) Field of Classification Search
USPC .......... 455/501, 438, 450, 509; 370/312, 281, 370/329; 714/749
See application file for complete search history.

(56) References Cited

U.S. PATENT DOCUMENTS

| | | |
|---|---|---|
| 2007/0097887 A1 | 5/2007 | Kim et al. |
| 2008/0080405 A1 | 4/2008 | Shin et al. |
| 2008/0316954 A1 | 12/2008 | Zheng |
| 2010/0331030 A1* | 12/2010 | Nory et al. ..................... 455/509 |
| 2011/0138244 A1* | 6/2011 | Zhu et al. ...................... 714/748 |

FOREIGN PATENT DOCUMENTS

KR    10-2008-0106299    12/2008

OTHER PUBLICATIONS

International Search Report for PCT/KR2010/000999 (PCT corresponding to present application).

* cited by examiner

*Primary Examiner* — Andrew Lai
*Assistant Examiner* — Jamaal Henson
(74) *Attorney, Agent, or Firm* — Morgan, Lewis & Bockius LLP (57) ABSTRACT

A method for receiving control information and a control information signaling receiving method are disclosed. If A-MAP information is allocated and transmitted, signaling overhead is greatly reduced, resulting in improved system performance. In addition, the method increases the number of data transmission areas in inverse proportion to control signaling overhead. In accordance with the method for receiving control information signaling, a mobile station correctly recognizes a location to which A-MAP information is allocated and transmitted, resulting in increased control information decoding efficiency.

6 Claims, 7 Drawing Sheets

METHOD FOR RECEIVING CONTROL INFORMATION AND CONTROL INFORMATION SIGNALING AND MOBILE STATION APPARATUS USING THE SAME

This application is a national stage application of PCT Application No. PCT/KR2010/000999, filed on Feb. 18, 2010, which claims the benefit of U.S. Provisional Application No. 61/153,624, filed on Feb. 18, 2009. The present national application also claims the benefit of Korean Patent Application No. 10-2010-0006394, filed Jan. 25, 2010.

TECHNICAL FIELD

The present invention relates to a wireless communication system, and more particularly to a method for receiving control information and control information signaling.

BACKGROUND ART

A brief description will be given below of contents of a downlink control channel in an IEEE 802.16m system. Downlink control channels include indispensable information required for operating the IEEE 802.16m system. Information transferred over the downlink control channel is hierarchically transmitted on different time scales from a superframe level to an Advanced Air Interface (AAI) subframe level.

A Super Frame Header (SFH) serving as one of downlink control channels includes necessary system parameters and system configuration information, and is then transmitted to a destination. In particular, the SFH includes system information needed for an advanced mobile station (AMS) to perform initial network entry, network re-entry, or handover. The SFH includes a Primary Superframe Header (P-SFH) and a Secondary Superframe Header (S-SFH). The P-SFH may be transmitted every superframe. The S-SFH may also be transmitted every superframe. The SFH may also be called a broadcast channel (BCH) (wherein the BCH may be classified into a primary broadcast channel (P-BCH) or a secondary broadcast channel (S-BCH)), or may have the same meaning as the BCH.

An Advanced MAP (A-MAP) includes unicast service control information. Accordingly, the A-MAP may also be called unicast control information. The unicast service control information may be mainly classified into user specific control information and non-user specific control information. The user-specific control information may be classified into assignment information, HARQ feedback information, and power control information. The assignment information is transmitted to an assignment A-MAP, the HARQ feedback information is transmitted to an HARQ feedback A-MAP, and the power control information is transmitted to a power control A-MAP.

Figure 1:
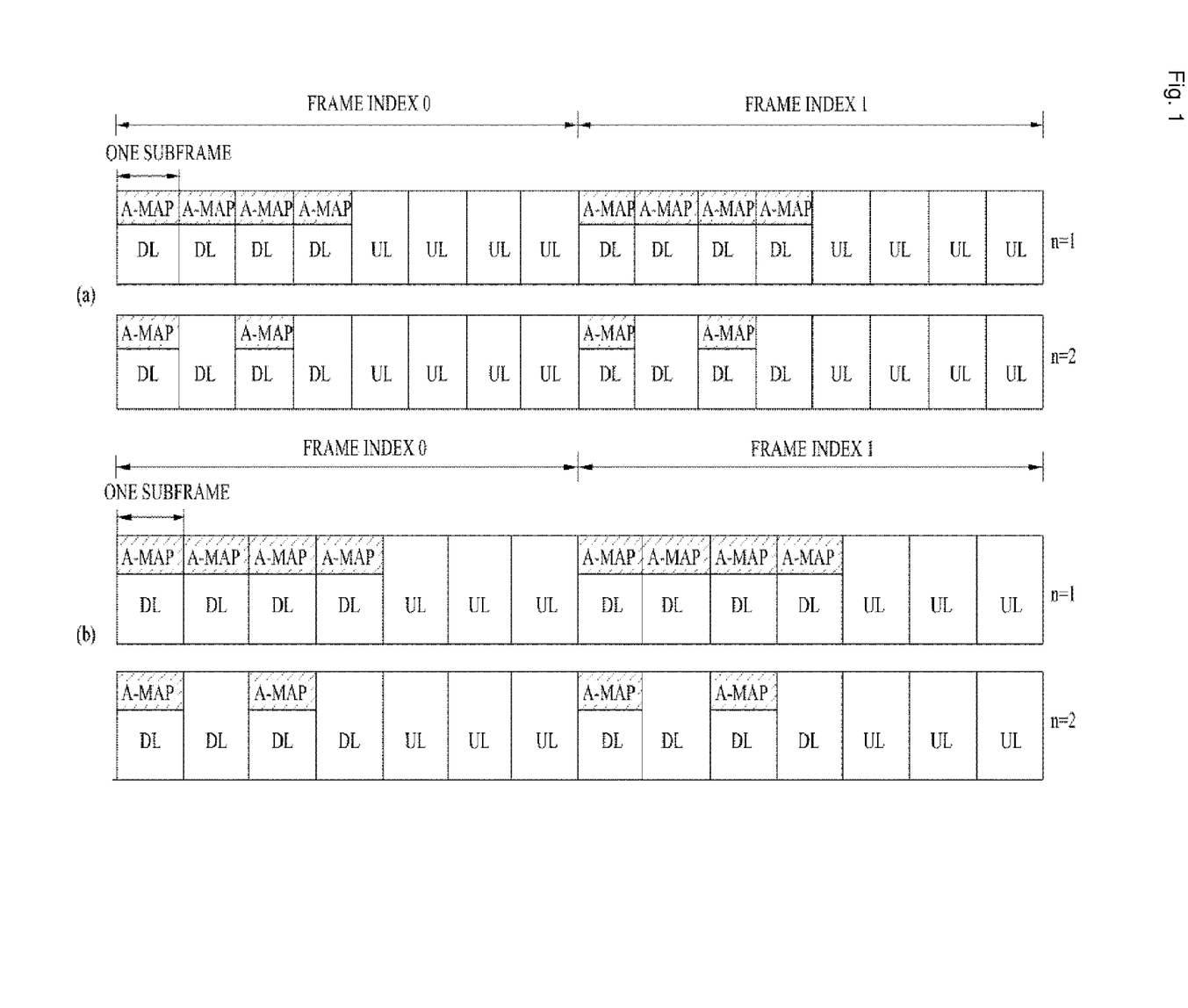
FIG. 1 shows an example of a location to which an A-MAP area is allocated in a Time Division Duplex (TDD) frame structure of a mobile communication system.

FIG. 1 shows an example of a location to which an A-MAP area is allocated in a Time Division Duplex (TDD) frame structure of a mobile communication system.

Referring to FIG. 1(a), one frame includes 8 subframes. In this case, an A-MAP transmission period (or A-MAP allocation period) may be denoted by 1 (n=1) or 2 (n=2). Referring to FIG. 1(b), it can be recognized that one frame includes 7 subframes. Likewise, the A-MAP transmission period may be denoted by 1 or 2. In this way, one frame may include 7 or 8 subframes. In the frame structure in which one frame includes 7 or 8 subframes, the A-MAP may be transmitted to the mobile station during the transmission period of 1 or 2. In this case, the A-MAP transmission period means a specific period in which the A-MAP is assigned to each subframe and transmitted. If the A-MAP transmission period is denoted by 1, this means that the A-MAP is assigned to each subframe of one frame composed of 7 or 8 subframes and is transmitted to the mobile station. If the A-MAP transmission period is denoted by 2, this means that A-MAP is assigned to every two subframes of one frame composed of 7 or 8 subframes, and is transmitted to the mobile station.

Generally, one frame having a channel bandwidth of 5 MHz, 10 MHz, or 20 MHz includes 8 subframes, and one frame having a channel bandwidth of 8.75 MHz includes 7 subframes. There is one limitation to the A-MAP transmission. Specifically, it is necessary for at least one A-MAP to be transmitted at a first subframe every frame. In the TDD frame structure shown in FIG. 1(a) or 1(b), the number of subframes belonging to one frame and the A-MAP transmission period has little effect upon the system performance and flexibility.

Figure 2:
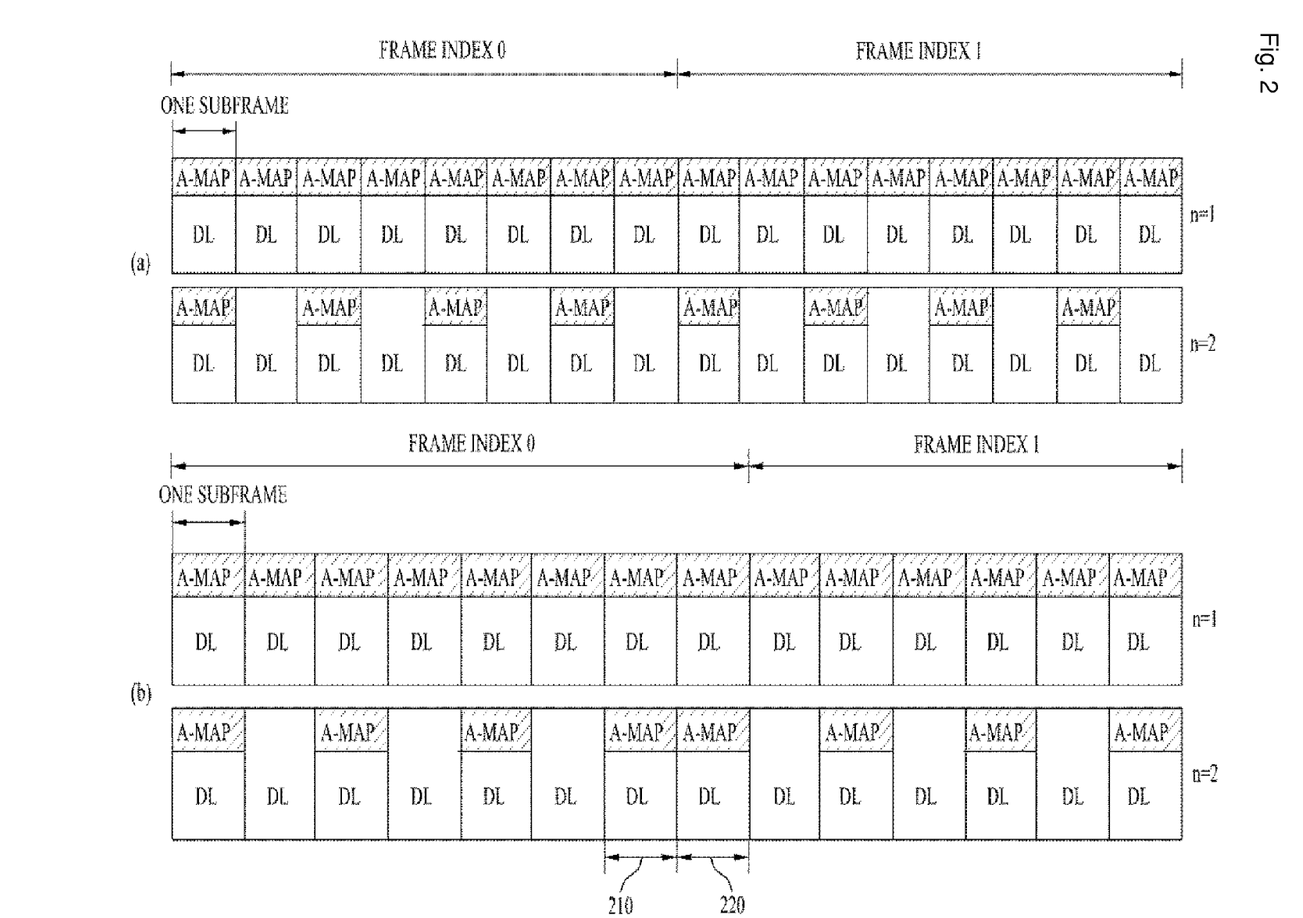
FIG. 2 shows an example of a location to which an A-MAP area is allocated in a Frequency Division Duplex (FDD) frame structure of a mobile communication system.

FIG. 2 shows an example of a location to which an A-MAP area is allocated in a Frequency Division Duplex (FDD) frame structure of a mobile communication system.

In the FDD frame structure shown in FIG. 2 in the same manner as in FIG. 1, one frame may include 7 or 8 subframes according to a channel bandwidth. In other words, one frame having a channel bandwidth of 5 MHz, 10 MHz, or 20 MHz may include 8 subframes, and one frame having a channel bandwidth of 8.75 MHz includes 7 subframes. In the FDD frame structure shown in FIG. 2, there is a limitation to the A-MAP transmission. In other words, at least one A-MAP is allocated to a first subframe every frame.

Referring to FIG. 2(a), one frame may include 8 subframes. The A-MAP may be allocated to one frame (i.e., 1 transmission period) or two subframes (2 transmission periods), and may be allocated to the mobile station. If the A-MAP transmission period is denoted by 2 in the FDD frame structure in which one frame includes 8 subframes, the A-MAP transmission period of 2 has little effect upon system performance.

Referring to FIG. 2(b), one frame may include 7 subframes. The A-MAP may be allocated to one frame (i.e., 1 transmission period) or two subframes (2 transmission periods), and may be allocated to the mobile station. If the A-MAP transmission period is denoted by 2 in the FDD frame structure in which one frame includes 8 subframes, the A-MAP transmission period of 2 has little effect upon system performance. However, provided that the A-MAP transmission period is denoted by 2 in the FDD frame structure in which one frame includes 7 subframes, and the A-MAP allocation is conducted to satisfy the limitations of the A-MAP transmission, the last subframe area 210 of a first subframe neighbors a first subframe area 220 of a second frame.

The A-MAP is allocated to each of two neighboring subframes 210 and 220, such that the system unavoidably generates unnecessary overhead in such control signaling, resulting in deterioration of system performance (e.g., throughput) and flexibility. As a result, there is needed a solution for preventing the system performance and flexibility from being deteriorated.

DISCLOSURE OF INVENTION

Technical Problem

Accordingly, the present invention is directed to a method for receiving control information and control information signaling, and a mobile station for use in the method, that substantially obviate one or more problems due to limitations and disadvantages of the related art.

An object of the present invention devised to solve the problem lies on a method for receiving control information.

Another object of the present invention devised to solve the problems lies on a method for receiving control information signaling.

Another object of the present invention devised to solve the problems lies on a mobile station for receiving control information.

Another object of the present invention devised to solve the problems lies on a mobile station for receiving control information signaling.

It will be appreciated by persons skilled in the art that the objects that can be achieved by the present invention are not limited to what have been particularly described hereinabove and the above and other objects that the present invention can achieve will be more clearly understood from the following detailed description taken in conjunction with the accompanying drawings.

Solution to Problem

The object of the present invention can be achieved by providing a method for receiving control information at a mobile station (MS), the method including receiving control information from a base station (BS), and decoding subframes including the control information, wherein the received control information is located in a first subframe of a first frame arranged at the earliest time in a frequency division duplex (FDD) frame structure in which one frame includes 7 subframes, and is located in subsequent subframes that are arranged at intervals of two subframes on a basis of the first subframe of the first frame.

In another aspect of the present invention, provided herein is a method for receiving control information at a mobile station (MS) in a wireless communication system, the method including receiving control information from a base station, and decoding subframes including the control information, wherein the received control information is located in first and second subframes of a first frame arranged at the earliest time in a frequency division duplex (FDD) frame structure in which one frame includes 7 or 8 subframes, and is located in subsequent subframes that are arranged at intervals of two subframes on a basis of the second subframe of the first frame.

In another aspect of the present invention, provided herein is a method for receiving signaling associated with control information at a mobile station (MS) in a wireless communication system, the method including receiving information of a number of subframes included in one frame and information of a transmission period of the control information from a base station, and decoding subframes including the control information based on the information of the number of subframes and the control information transmission period information.

In another aspect of the present invention, provided herein is a method for receiving signaling associated with control information at a mobile station (MS) in a wireless communication system, including receiving an offset value about each of plural subframes to which the control information is allocated from a base station (BS), and decoding the subframes including the control information based on the received offset value, wherein the control information is allocated at predetermined interval, the offset value is represented as interval between a first subframe with specific index value including the control information in a frame and subframe with index 0 in the frame.

In another aspect of the present invention, provided herein is a mobile station (MS) for receiving control information in a wireless communication system, including a receiving module for receiving control information from a base station (BS), and a decoding module for decoding subframes including the control information, wherein the control information is located in a first subframe of a first frame arranged at the earliest time in a frequency division duplex (FDD) frame structure in which one frame includes 7 subframes, and is located in subsequent subframes that are arranged at intervals of two subframes on a basis of the first subframe of the first frame.

In another aspect of the present invention, provided herein is a mobile station for receiving control information in a wireless communication system, including receiving control information from a base station, and decoding subframes including the control information, wherein the received control information is located in first and second subframes of a first frame arranged at the earliest time in a frequency division duplex (FDD) frame structure in which one frame includes 7 or 8 subframes, and is located in subsequent subframes that are arranged at intervals of two subframes on a basis of the second subframe of the first frame.

Advantageous Effects of Invention

If A-MAP information is allocated and transmitted according to the present invention, signaling overhead can be greatly reduced, resulting in improved system performance. In addition, the present invention can increase the number of data transmission areas in inverse proportion to control signaling overhead. In accordance with the method for receiving control information signaling, a mobile station can correctly recognize a location to which A-MAP information is allocated and transmitted, such that the present invention can increase the efficiency of decoding control information.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as an IEEE 802.16 system, but the present invention is not limited thereto and the remaining parts of the present invention other than unique characteristics of the IEEE 802.16 system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may include mobile or fixed advanced mobile stations (AMSs), for example, a user equipment (UE), a mobile station (MS) and the like. Also, the base station (BS) may refer to an arbitrary node of a network end which communicates with the above terminal, and may include a Node B (Node-B), an eNode B (eNode-B), and an access point (AP) and the like.

In a mobile communication system, the AMS may receive information from the base station via a downlink, and may transmit information via an uplink. The information that is transmitted and received to and from the AMS includes data and a variety of control information. There are a variety of physical channels according to categories of transmission (Tx) and reception (Rx) information of the AMS.

Figure 3:
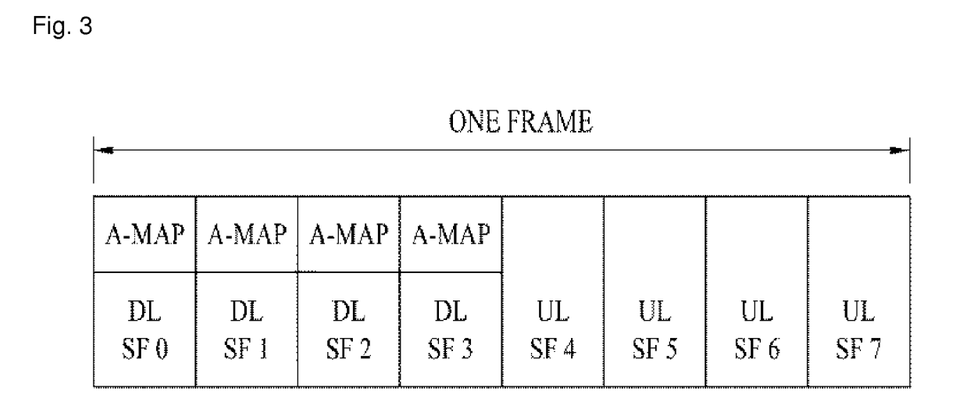
FIG. 3 exemplarily shows a location to which an A-MAP area is allocated in a frame structure of an IEEE 802.16m system.

FIG. 3 exemplarily shows a location to which an A-MAP region is allocated in a frame structure of an IEEE 802.16m system.

In the case of a frequency division duplex (FDD) frame structure for use in the IEEE 802.16m system, the A-MAP is allocated to each subframe (not shown). As shown in FIG. 3, in a time division duplex (TDD) frame structure, the A-MAP may be located in each of all downlink subframes. Particularly, in the TDD frame structure shown in FIG. 3, the ratio of the number of downlink subframes to the number of uplink subframes in one frame is 4:4. All A-MAPs belonging to one frame share one physical resource region called an A-MAP region. The A-MAP region may be located in each of all downlink subframes. Downlink data corresponding to control information included in the A-MAP region may be allocated by the base station (BS) to a resource region within a subframe including the A-MAP region, and then transmitted to the mobile station.

Figure 4:
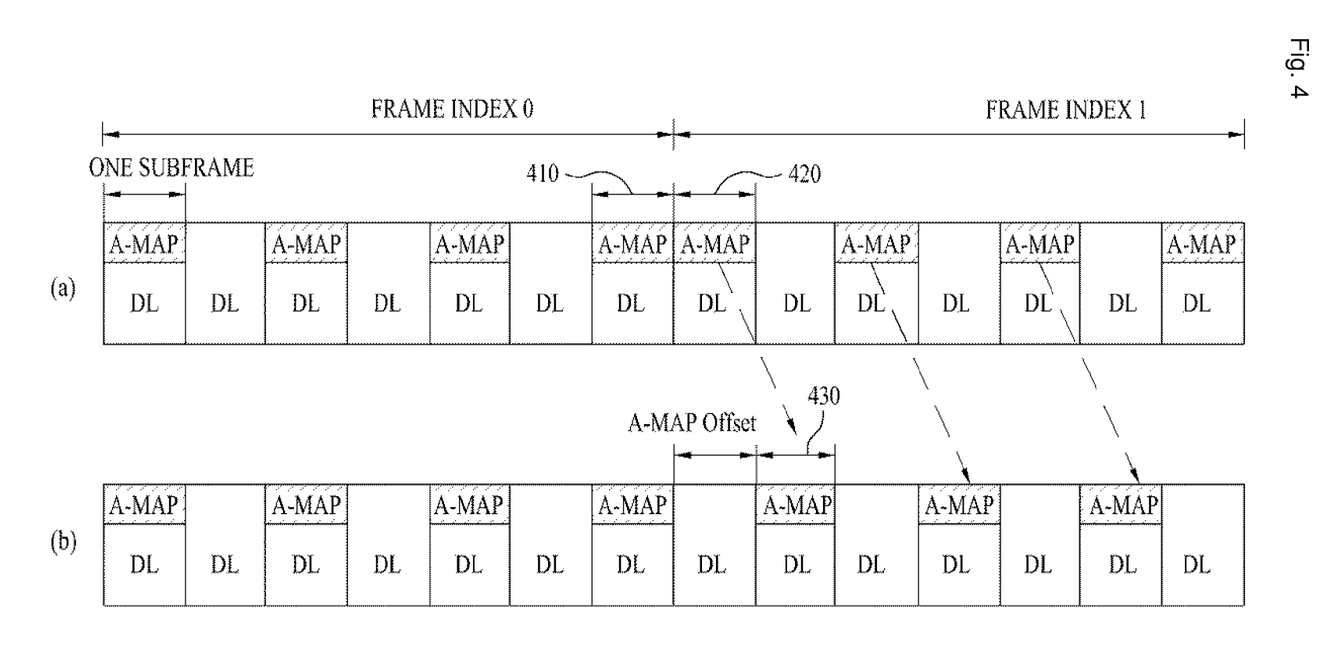
FIG. 4 exemplarily shows a method for allocating an A-MAP in an FDD frame structure according to one embodiment of the present invention.

FIG. 4 exemplarily shows a method for allocating an A-MAP in an FDD frame structure according to one embodiment of the present invention.

Referring to FIGS. 4(a) and 4(b), it can be recognized that the A-MAP is allocated at intervals of two subframes (i.e., n=2) and transmitted. That is, FIGS. 4(a) and 4(b) show that one A-MAP is allocated to every two subframes and then transmitted. The FDD frame structure shown in FIG. 4(a) or 4(b) has a channel bandwidth of 8.75 MHz, and one frame includes 7 subframes. Although the A-MAP is allocated at intervals of the A-MAP transmission period of 2 (n=2) according to A-MAP transmission limitation (this means that the A-MAP is allocated to a first subframe of each frame and then transmitted), the A-MAP is allocated to the last subframe region 410 of a frame indexed with '0' (i.e., subframe with index 0) and is also allocated to a first subframe 420 of the other frame indexed with '1' (i.e., subframe with index 1). In this case, the subframe 410 and the subframe 420 neighbor each other. In other words, since the A-MAP is allocated to a first frame of the frame with index 1 according to the A-MAP transmission limitation, the A-MAP transmission period between the last subframe region 410 of the frame with index 0 and the first subframe 420 of the frame with index 1 is '1'.

However, as previously stated above, such A-MAP allocation may deteriorate not only control signaling overhead but also system performance.

Therefore, as shown in FIG. 4(b), the last subframe region 410 of the frame with index 0 and the first subframe region 420 of the frame with index 1 do not satisfy the A-MAP transmission limitation, and the A-MAP is not allocated to the first subframe region 420 of the frame with index 1. In other words, the A-MAP is not allocated to the first subframe region 420 of the frame with index 1, and is allocated to a second subframe region 430 of the frame with index 1. Although the above-mentioned A-MAP allocation does not satisfy the A-MAP transmission limitation, it can maintain the A-MAP transmission period of 2.

In addition, the number of A-MAP transmission times is reduced because of the above-mentioned A-MAP allocation, so that control signaling overhead can be greatly reduced. As the control signaling overhead is gradually reduced, the number of data transmission regions is gradually increased.

Referring to FIG. 4(b), the A-MAP is allocated to subframes starting from a first subframe in frame with index 0 and 1 (i.e., an odd frame), and is allocated to a transmission period of 2 and transmitted, so that there is no A-MAP offset. In other words, the A-MAP is allocated to subframes starting from the first subframe of the frame with index 0 in the same manner as in the A-MAP transmission limitation, such that the A-MAP offset value may be considered to be '0'.

However, in order to reduce signaling overhead, in the case of the frame with index 1 (i.e., an even frame), the A-MAP may be allocated to subframes starting from the second subframe instead of the first subframe. As a result, the index of each subframe allocated with the A-MAP in the frame with index 1 is increased by one as compared to the index of each subframe allocated with the A-MAP in the frame with index 0. In this way, in the first subframe 420 included in the frame with index 1, the A-MAP offset corresponding to one subframe is applied (A-MAP offset=1), so that the A-MAP begins to be allocated to subframes from the second subframe 430.

Figure 5:
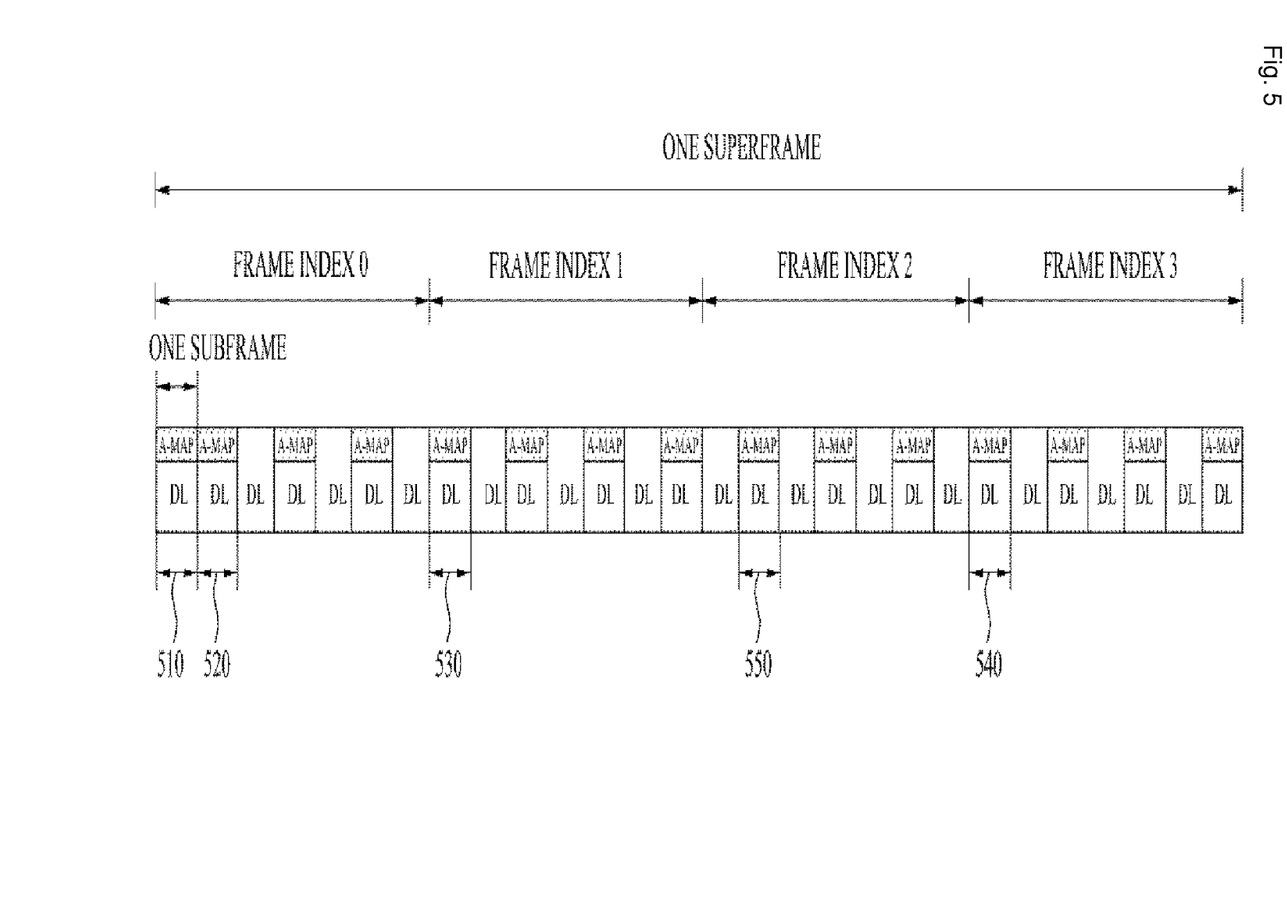
FIG. 5 exemplarily shows a method for allocating an A-MAP in an FDD frame structure according to another embodiment of the present invention.

FIG. 5 exemplarily shows a method for allocating an A-MAP in an FDD frame structure according to another embodiment of the present invention.

Referring to FIG. 5, it can be recognized that the A-MAP is allocated at intervals of two subframes (i.e., n=2) and transmitted. That is, one A-MAP is allocated to every two subframes, and then transmitted. The FDD frame structure shown in FIG. 5 has a channel bandwidth of 8.75 MHz, and one frame includes 7 subframes.

Although one A-MAP is allocated to every two subframes (n=2) and transmitted as shown in FIG. 5, a first subframe 510 of the frame with index 0 included in a superframe may have a transmission period of 1 (n =1). In other words, the first frame 510 of the frame with index 0 included in the superframe may always have the A-MAP transmission period of 1, irrespective of the A-MAP transmission period value applied to another subframe. Therefore, although the A-MAP transmission period of 2 is applied to the FDD frame structure shown in FIG. 5, the A-MAP may be allocated to not only a first subframe 510 of the frame with index 1 but also to a second subframe 520 subsequent to the first subframe 510. That is, the A-MAP transmission period of 1 (n=1) may be fixed to the first subframe 510 of the superframe, irrespective of A-MAP transmission periods of other subframes.

For example, it is assumed that the A-MAP transmission period of 2 is allocated and transmitted in one superframe as shown in FIG. 5. In spite of this assumption, the A-MAP may be allocated to each of the first and second subframes 510 and 520 of the frame with index 0 of the superframe, irrespective of the A-MAP transmission period. The A-MAP transmission period of 2 may be allocated to subframes subsequent to the second subframe 520, and transmitted to the mobile station. According to the above-mentioned allocation scheme, the A-MAP may be allocated to subframes starting from the first subframe 530 or 540 in the odd-indexed frame (i.e., frame with index 1 or 3). Therefore, the A-MAP offset results in zero '0' in each frame having an odd frame index.

In contrast, the A-MAP may be allocated to subframes starting from a second subframe 520 or 550 in the even-indexed frame (i.e., the frame with index 0 or 2) other than the first subframe 510 of the superframe, and transmitted to the mobile station. Therefore, the A-MAP offset results in '1' in each frame having an even frame index.

Figure 6:
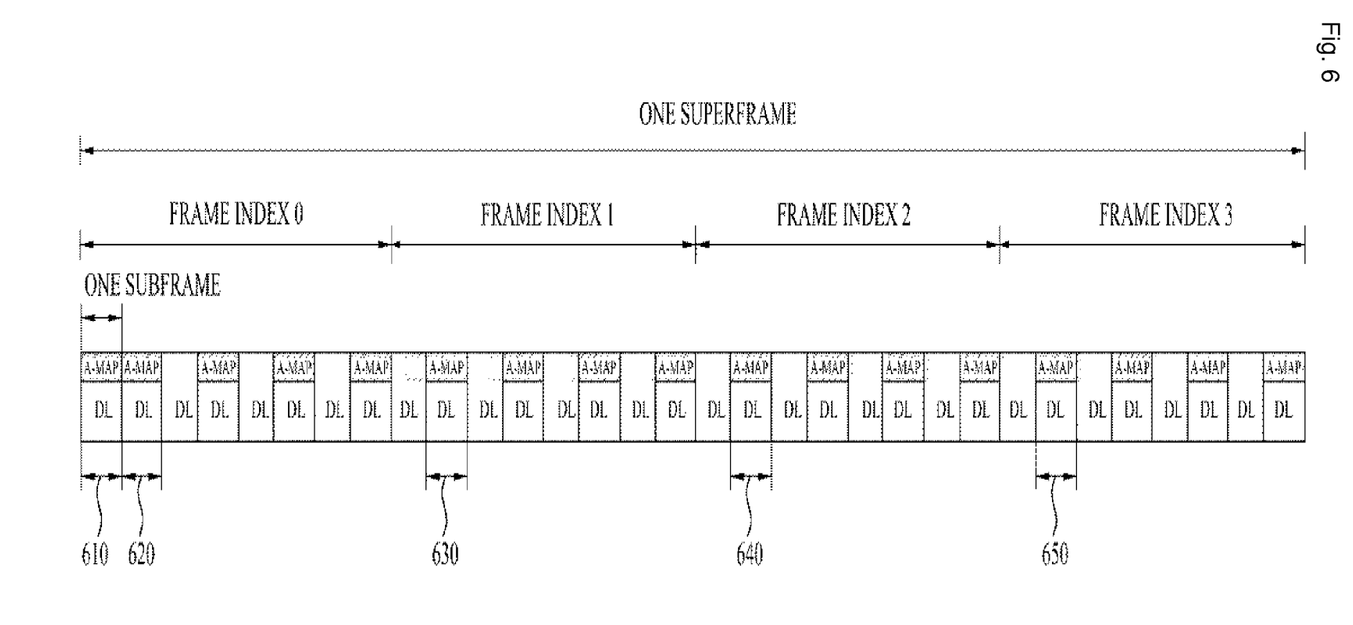
FIG. 6 exemplarily shows a method for allocating an A-MAP in an FDD frame structure according to yet another embodiment of the present invention.

FIG. 6 exemplarily shows a method for allocating an A-MAP in an FDD frame structure according to yet another embodiment of the present invention.

Referring to FIG. 6, it can be recognized that the A-MAP is allocated at intervals of two subframes (i.e., n=2) and transmitted. The FDD frame structure shown in FIG. 6 has a channel bandwidth of 5 MHz, 10 MHz, or 20 MHz, and one frame may include 8 subframes. Although one A-MAP is allocated to every two subframes (n=2) and transmitted as shown in FIG. 6, a first subframe 610 of the frame with index 0 included in a superframe may have a transmission period of 1 (n=1). In other words, the first frame 610 of the frame with index 0 included in the superframe may always have the A-MAP transmission period of 1, irrespective of the A-MAP transmission period value applied to another subframe.

Although the A-MAP transmission period of 2 is applied to the FDD frame structure shown in FIG. 6, the A-MAP may be allocated to each of a first subframe 610 of the frame with index 0 and a second subframe 620 subsequent to the first subframe 610. In other words, the A-MAP transmission period of 1 (n=1) may be fixed to the first subframe 610 of the superframe, irrespective of A-MAP transmission periods of other subframes.

For example, it is assumed that the A-MAP transmission period of 2 is allocated and transmitted in one superframe as shown in FIG. 6. In spite of this assumption, the A-MAP may be allocated to each of the first and second subframes 610 and 620 of the frame with index 0 of the superframe, irrespective of the A-MAP transmission period. The A-MAP transmission period of 2 may be allocated to subframes subsequent to the second subframe 620, and transmitted to the mobile station. According to the above-mentioned allocation, the A-MAP may be allocated to subframes starting from the second subframe 630, 640 or 650 in all frames. Therefore, the A-MAP offset results in '1' in all frames.

In contrast, the A-MAP may be allocated to subframes starting from a second subframe 620 or 650 in the even-indexed frame (i.e., the frame with index 0 or 2) other than the first subframe 610 of the superframe, and transmitted to the mobile station. Therefore, the A-MAP offset results in '1' in each frame having an even frame index.

A variety of methods for signaling information about the A-MAP offset value at a base station (BS) to a mobile station will hereinafter be described with reference to the appended drawings.

A first method from among the above-mentioned methods will hereinafter be described in detail.

The A-MAP offset value may be used as a system parameter predefined for A-MAP allocation. The mobile station may determine whether or not the receiving frame structure is the FDD frame structure. The base station may provide not only the A-MAP transmission period value but also the number of subframes included within one frame according to a channel bandwidth to the mobile station that has recognized reception of the FDD frame. Therefore, the mobile station may implicitly recognize the A-MAP offset value using not only the A-MAP transmission period but also the number (7 or 8) of subframes belonging to one frame. Accordingly, the mobile station can recognize the A-MAP location information and the A-MAP allocation information without receiving an additional signaling result from the base station. The above-mentioned method has an advantage in that the mobile station acquires A-MAP allocation information without performing an additional signaling process so that control information signaling overhead can be greatly reduced.

A second method from among the above-mentioned methods will hereinafter be described in detail.

The base station may explicitly inform the mobile station of the A-MAP offset value using a header of the superframe. The A-MAP offset value may be signaled to the mobile station via either a secondary-superframe header (S-SFH) or a broadcast channel (BCH).

Figure 7:
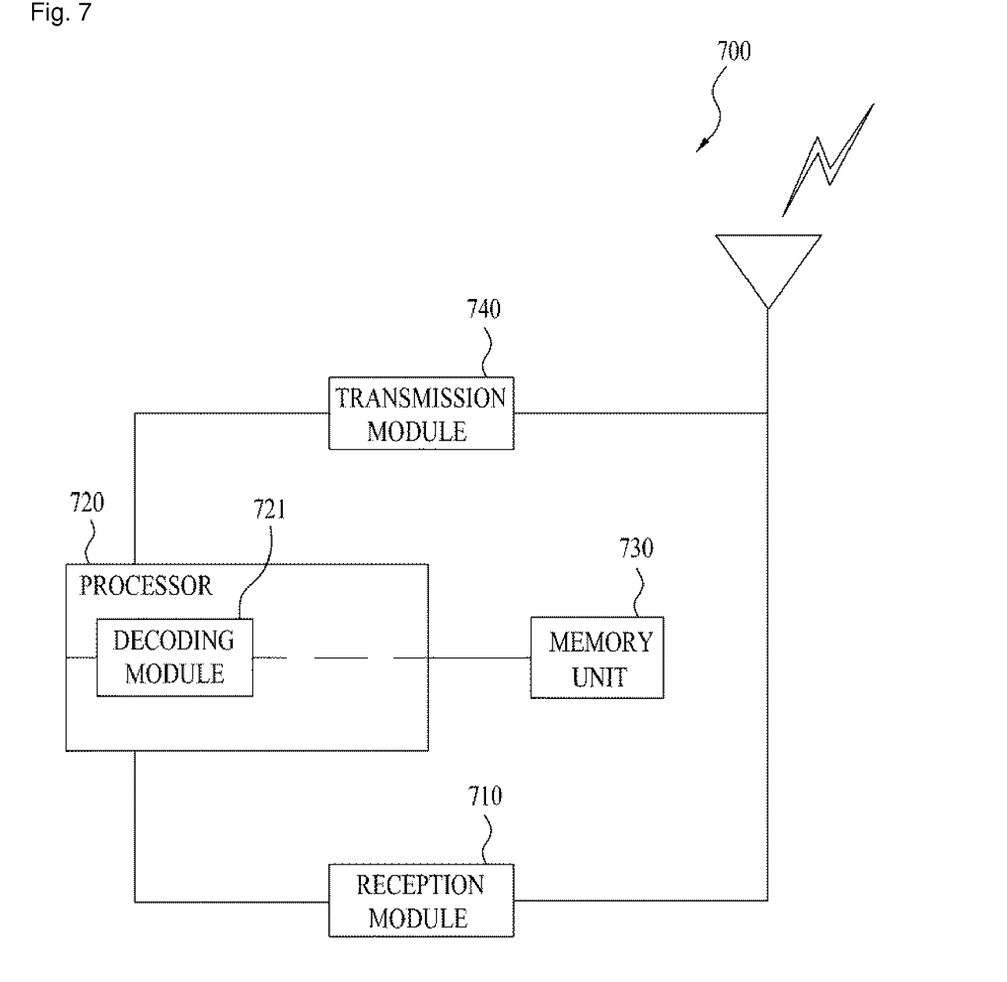
FIG. 7 is a block diagram illustrating a mobile station for receiving control information according to the present invention.

FIG. 7 is a block diagram illustrating a mobile station for receiving control information according to the present invention.

Referring to FIG. 7, the mobile station 700 may include a reception module 720, a processor 720, a memory unit 730, and a transmission module 740.

The reception module 710 may receive various signals, control signaling, data, and control information from an external part such as a base station.

The processor 720 may include a decoding module 721. The decoding module 721 may decode control information and data received from the base station. The decoding module 721 may not perform blind-decoding on all the downlink subframes received from the base station, but selectively decode some subframes, each of which includes control information (e.g., A-MAP).

The memory unit 730 may receive information received from the base station and other information calculated in the processor 720 for a predetermined period of time, and may be replaced with a buffer (not shown) or the like.

The transmission module 740 may transmit a variety of information (e.g., control information, feedback information, etc.) and signals to the base station.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

Mode for the Invention

Various embodiments have been described in the best mode for carrying out the invention.

Industrial Applicability

If A-MAP information is allocated and transmitted according to the present invention, signaling overhead can be greatly reduced, resulting in improved system performance. In addition, the present invention can increase the number of data transmission areas in inverse proportion to control signaling overhead. In accordance with the method for receiving control information signaling, a mobile station can correctly recognize a location to which A-MAP information is allocated and transmitted, such that the present invention can increase the efficiency of decoding control information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving control information at a mobile station (MS) in a wireless communication system, the method comprising:
   receiving control information from a base station (BS); and
   decoding subframes including control information,
   wherein, in odd-numbered frames, the control information is included in every odd-number subframe so that the first subframes in the odd-numbered frames include the control information,
   wherein, in even-numbered frames, the control information is included in every even-numbered subframe so that the first subframes in the even-numbered frames do not include the control information, and
   wherein the odd-numbered frames and the even-numbered frames are comprised in a frequency division duplex frame structure in which one frame includes 7 subframes.

2. The method according to claim 1, wherein the control information is an Advanced-MAP (A-MAP).

3. A method for receiving control information at a mobile station (MS) in a wireless communication system, the method comprising:
   receiving control information from a base station (BS); and
   decoding subframes including the control information,
   wherein the control information is located in first subframes in a first frame and even-numbered frames in a frequency division duplex (FDD) frame structure in which one frame includes 7 subframes, while none of the first subframes in odd-numbered frames, other than the first frame, in the frequency division duplex frame structure comprise the control information, and
   wherein the control information is comprised in the first subframe and even-numbered subframes in the first frame, in every odd-numbered subframes in the even-numbered frames in the frequency division duplex frame structure and in every even-numbered subframes in the odd-numbered frames, in the frequency division duplex frame structure.

4. The method according to claim 3, wherein the control information is an Advanced-MAP (A-MAP).

5. A mobile station for receiving control information in a wireless communication system, the mobile station comprising:
   a receiving module for receiving control information from a base station (BS); and
   a decoding module for decoding subframes including the control information,
   wherein, in odd-numbered frames, the control information is included in every odd-number subframe so that the first subframes in the odd-numbered frames include the control information,
   wherein, in even-numbered frames, the control information is included in every even-numbered subframe so that the first subframes in the even-numbered frames do not include the control information, and
   wherein the odd-numbered frames and the even-numbered frames are comprised in a frequency division duplex frame structure in which one frame includes 7 subframes.

6. A mobile station for receiving control information in a wireless communication system, the mobile station comprising:
   receiving control information from a base station; and
   decoding subframes including the control information,
   wherein the control information is located in first subframes in a first frame and even-numbered frames in a frequency division duplex (FDD) frame structure in which one frame includes 7 subframes, while none of the first subframes in odd-numbered frames, other than the first frame, in the frequency division duplex frame structure comprise the control information, and
   wherein the control information is comprised in the first subframe and even-numbered subframes in the first frame, in every odd-numbered subframes in the even-numbered frames in the frequency division duplex frame structure and in every even-numbered subframes in the odd-numbered frames in the frequency division duplex frame structure.

* * * * *